Oct. 31, 1967  R. E. ROBERTS  3,349,806
REINFORCED HOSE CONSTRUCTION AND METHOD OF MAKING THE SAME
Filed Dec. 7, 1964  2 Sheets-Sheet 1

INVENTOR.
Robert E. Roberts
BY
ATTORNEYS

Oct. 31, 1967 R. E. ROBERTS 3,349,806
REINFORCED HOSE CONSTRUCTION AND METHOD OF MAKING THE SAME
Filed Dec. 7, 1964 2 Sheets-Sheet 2
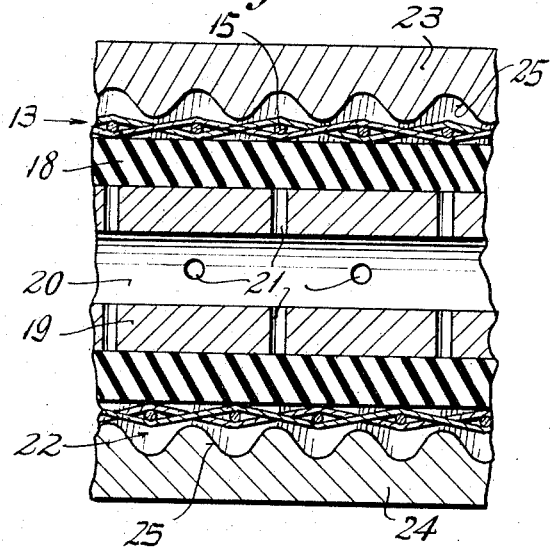
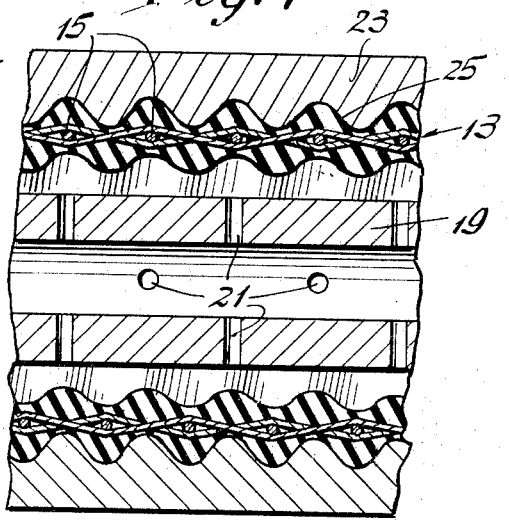
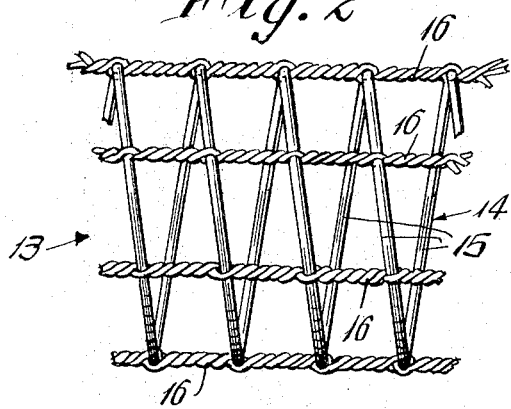
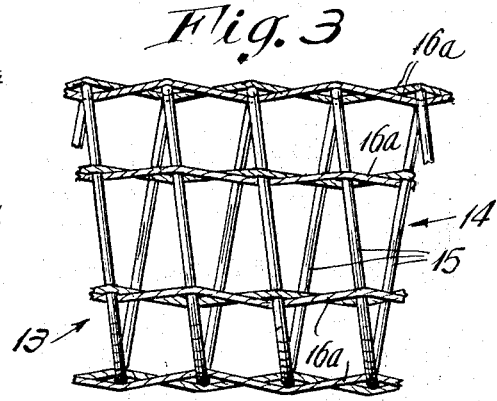
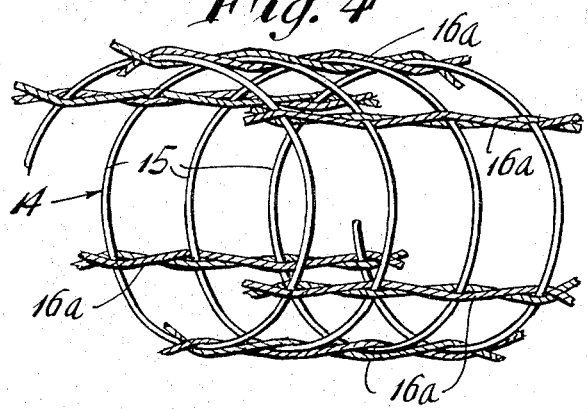
INVENTOR.
Robert E. Roberts
BY
Johnson and Kline
ATTORNEYS United States Patent Office 3,349,806
Patented Oct. 31, 1967

3,349,806
REINFORCED HOSE CONSTRUCTION AND
METHOD OF MAKING THE SAME
Robert E. Roberts, Wilton, Conn., assignor to Fred T.
Roberts & Company, Wilton, Conn.
Filed Dec. 7, 1964, Ser. No. 416,556
11 Claims. (Cl. 138—122)

ABSTRACT OF THE DISCLOSURE

A flexible hose of elastomeric material having a reinforcement therein comprising spaced turns of resilient strand material, such as wire, capable of withstanding radial expansion and contraction of the hose, which turns are tied together at spaced points therearound by flexible, longitudinally extending strands, such as textile material, which resist elongation of the hose so as to form a reinforcing cage within the hose.

---

Heretofore in providing hose with a reinforcement against longitudinal expansion or stretching as well as against radial deformation, it has been proposed to lay into the body of the hose a longitudinal strip which is embedded in the hose. The strip, however, was not interlocked in any way with the reinforcement turns which are provided for preventing radial deformation of the hose. These separate elements have not been entirely satisfactory in use and have required excessive care in handling during the process of making the hose.

The present invention provides a novel hose construction and a method of making reinforced hose whereby longitudinal expansion or stretching of the hose is prevented by a plurality of longitudinally extending groups of strands which are interlocked with spaced reinforcement turns to form a reinforcing cage, the turns being capable of withstanding radial deformation of the hose and the longitudinal strands preventing elongation thereof so that the hose of the present invention has strong bursting strength and is not unduly stretched by any internal pressures in the hose.

In carrying out the present invention the novel reinforcement for the hose is formed into a reinforcing cage in which spaced turns of a resilient strand material, such as spring wire or the like, are provided and are connected at spaced points around the turns by longitudinally extendiing groups of strands which are twisted and interlocked with the turns or which are intertwined with the turns by having strands in each group pass over and under the turns to effectively lock them in position. The longitudinally extending strands are flexible, preferably textile strands, so as not to impair the flexibility of the hose, but are capable of preventing longitudinal stretching or expansion of the hose.

In the novel method of making the hose, the reinforcing cage is formed by connecting the turns thereof by means of groups of strands which can be twisted and have the turns interlocked at points along the longitudinal extension thereof or can have the groups of strands intertwined with the turns so as to make a unitary cage structure which can be readily handled. During the use thereof in carrying out the method, the strands not only serve to reinforce the hose, but insure the proper location and spacing of the turns during the handling of the cage element in the manipulations involved in the method. After the cage is formed, it is easily positioned over a tube of uncured rubber or other elastomeric material and it is put into a mold cavity. The material of the tube is softened and expanded so that it flows through and around the elements of the cage member and embeds the cage in the body thereof to form a reinforced hose.

If desired, the mold cavity can be corrugated and the turns in the reinforcement cage positioned in the mold in predetermined relation to the corrugations in the wall so that a corrugated reinforced wall is produced.

The turns in the reinforcement cage can be wire rings or can be a wire helix having spaced turns as required in the hose depending upon whether it is to have an annularly or helically corrugated side wall.

Other features and advantages of the invention will be apparent from the specification and claims when considered in connection with the accompanying drawings in which:

FIG. 2 shows a fragmentary view of a reinforcing cage formed by twisting longitudinally extending strands to interlock them with the spaced turns of a helical member.

FIG. 3 is a view similar to FIG. 2 showing groups of strands intertwined with the helical member to form the cage.

FIG. 4 is a perspective view of FIG. 3.

FIG. 6 is a fragmentary view showing the elastomeric tube on a mandrel and the reinforcing cage positioned thereover with the assembly located in the mold prior to the molding operation.

FIG. 7 is a view similar to FIG. 5 showing the finished molded hose in the mold after the molding operation.

Figure 1:
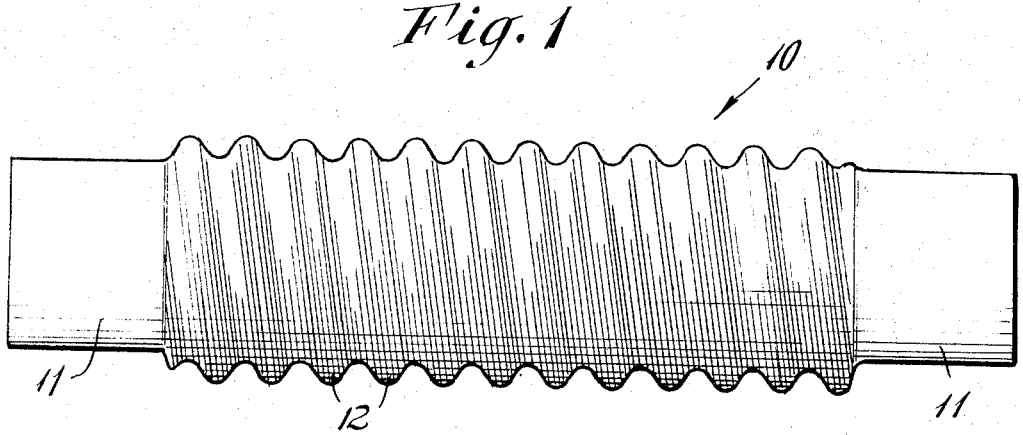
FIGURE 1 is a side view partly in section of a hose of the present invention.

The present invention embodies a hose 10 having a smooth end portion 11 and corrugated side walls 12. As shown in FIGS. 1 and 7, the side walls have a reinforcement embedded therein in the form of a novel cage structure 13 which will resist radial deformation of the hose and also resist longitudinal extension of the hose.

In carrying out the invention, the novel reinforcing cage is provided in which a plurality of spaced turns of a resilient reinforcing strand material, such as spring wire or the like material, are tied together by longitudinal flexible strands. In the form of the invention shown in FIG. 2, the reinforcing strand comprises a helical spring 14 or the like material and the turns 15 of the helix are longitudinally spaced and are interconnected at a plurality of spaced points around the turns by longitudinally extending strands 16, preferably of fibrous material, which are twisted and have the spaced turns 15 caught in the twist at spaced points therealong and tie the turns together. This will produce a reinforcing cage which will not only prevent radial deformation and stretching of the hose as in case of high internal pressure, but also will hold the turns in fixed spaced relation and will prevent displacement thereof during the handling of the cage and the molding of the hose.

Figure 5:
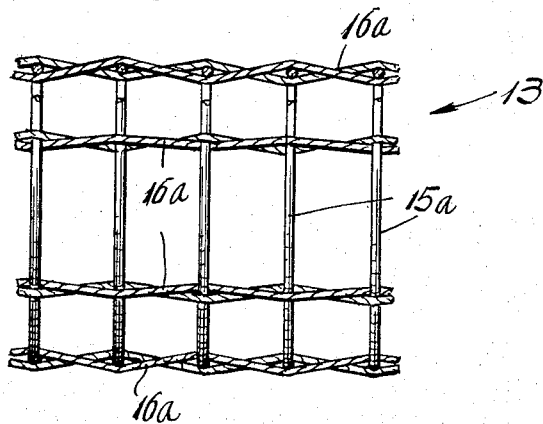
FIG. 5 is a view similar to FIG. 3 showing spaced rings located in the reinforcing cage.

In the form of the invention shown in FIG. 3, the cage is formed by connecting the spaced turns 15 of the helix 14 by an interweaving or intertwining of groups of strands 16a with the turns at spaced points around the turns. It will be noted in FIG. 3 and in FIG. 4, which shows a perspective view of FIG. 3, that the groups of fabric strands are spaced around the turns and are interlaced with the helical coils so that in each group the strands thereof pass over and under the alternate turns and interlace therewith to tie the turns together and form a cage structure capable of withstanding elongation and radial deformation. In accordance with the present invention, the turns may also be formed by spaced rings 15a which are tied together at spaced points around the turns to form the reinforcing cage. For example, they are shown in FIG. 5 as being interlaced by the strands 16a so as to provide an annular reinforcement for the hose. In making the reinforcements, the helix or the rings are formed and the longitudinally extending threads are twisted and interlocked with, or are interlaced with, the turns at spaced intervals therearound as may be required. While these intervals may be at 45° or 90°, they are herein illustrated as being spaced at 60° apart. The strands are twisted or interlaced either by hand or by a suitable twisting machine or a loom for forming the tubular member. For example, one such machine for accomplishing this purpose would be a well-known Chernack loom modified to remove some of the carriers and by changing the gear ratios for actuating the carriers so that the loom would produce not only the helical coil, but at the same time, interlace the strands with the coil, as shown in FIG. 3. With the turns accurately locked in place to form the reinforcing cage, the cage can be then handled in the operation of forming the hose without danger of displacement.

In forming the hose according to the present method, the cage is formed as noted above and a layer or tube 18 of elastomeric material is positioned over a usual mandrel 19 having a central bore 20 and lateral ports 21 in communication with the interior of the layer or tube of elastomeric material. The reinforcing cage 13 with its tied-together turns is then inserted over the layer and the assembled mandrel 19, layer 18 and reinforcing cage 13 are then positioned within a cavity 22 of a usual multi-part mold 23, 24. Such a mandrel and mold are shown in detail in U.S. Patent 2,897,840.

As shown in FIG. 6, the cavity can be provided, if desired, with helically corrugated walls 25 in which case the assemblage on the mandrel is positioned therein with the spaced turns 15 in predetermined relation to the corrugations in the walls of the cavity. Heat and pressure are then supplied to the mold and mandrel to produce an internal pressure in the layer of material and cause it to flow around the elements of the cage to embed the cage therein and to flow outwardly into engagement with the wall to produce the corrugations in the smooth, molded outer surface of the hose as shown in FIG. 7. The hose is then cured or set in its final form.

It will be seen that the reinforcing cage will not interfere with the flexibility of the hose and will permit contraction of the hose longitudinally in such instances where it is necessary to fit it into a small space, as found in an automobile cooling system; yet, will prevent any extreme pressures in the system from causing rupture by bursting or by elongation or stretching of the hose due to said excess pressure.

The present invention, therefore, provides a unique method which is highly satisfactory and inexpensive for producing an annularly or helically reinforced hose which is reinforced against bursting and against longitudinal stretching.

Variations and modifications may be made within the scope of the claims and portions of the improvements may be used without others.

I claim:

1. A reinforced flexible hose of elastomeric material comprising a corrugated tubular body of elastomeric material having embedded therein a reinforcing element comprising spaced turns of resilient strand material capable of restraining radial deformation of the hose with the turns connected at spaced points therearound by longitudinally extending flexible strands interlocked with the turns to resist longitudinal stretching of the hose and hold said turns in predetermined position with respect to the corrugations of said tubular body.

2. A reinforced flexible hose of elastomeric material comprising a tubular body of elastomeric material having a corrugated outer surface and having embedded therein a reinforcing cage comprising spaced turns of resilient strand material capable of restraining radial deformation of the hose disposed in predetermined position within the corrugations of said outer surface with the turns connected at spaced points therearound by groups of at least two longitudinally extending twisted strands with the twist interlocked with the turns to resist longitudinal stretching of the hose and maintaining said turns in said predetermined position.

3. A reinforced flexible hose of elastomeric material comprising a corrugated tubular body of elastomeric material having embedded therein a reinforcing cage comprising spaced turns of resilient strand material capable of restraining radial deformation of the tubular body with the turns disposed in predetermined position within and relative to the corrugations of the body and connected at spaced points therearound by pairs of longitudinally extending flexible strands intertwined with the turns to resist longitudinal stretching of the hose and maintaining said turns in said predetermined position.

4. A reinforced flexible hose of elastomeric material comprising a tubular body of elastomeric material having a helically corrugated outer surface and having embedded therein a reinforcing cage comprising a helix of resilient strand material having spaced turns capable of restraining radial deformation of the hose disposed in predetermined position within the corrugations of said outer surface with the turns connected at spaced points therearound by groups of flexible strands, each group comprising at least two strands interlocked with the turns to resist longitudinal stretching of the hose and maintaining said turns in said predetermined position.

5. A reinforced flexible hose of elastomeric material comprising a tubular body of elastomeric material having an annularly corrugated outer surface and having embedded therein a reinforcing element comprising spaced rings of resilient strand material worming annular turns capable of restraining radial deformation of the hose disposed in predetermined position within the corrugations of said outer surface with the turns connected at spaced points therearound by groups of longitudinally extending flexible strands, each group comprising at least two strands interlocked with the turns to resist longitudinal stretching of the hose and maintaining said turns in said predetermined position.

6. A molded reinforced flexible hose of elastomeric material comprising a tubular body of elastomeric material having embedded therein a reinforcing element comprising spaced turns of resilient wire capable of restraining radial deformation of the hose with the turns connected at spaced points therearound by groups of longitudinally extending flexible fibrous strands, each group comprising at least two strands interlocked with the turns to resist longitudinal stretching of the hose and maintaining the turns in a predetermined position in the hose during the molding thereof.

7. A reinforcing cage for use in a molded reinforced flexible hose comprising a plurality of spaced turns of resilient material capable of resisting radial deformation of the hose, which turns are connected at spaced points around the turns by groups of longitudinally extending flexible strands, each group comprising at least two strands interlocked with the turns, said strands holding the cage together and preventing separation and displacement of said turns during molding.

8. A reinforcing cage for use in a molded reinforced flexible hose comprising a plurality of spaced helical turns of resilient material capable of resisting radial deformation of the hose, which turns are connected at spaced points around the turns by groups of longitudinally extending flexible strands, each group comprising at least two strands with the strands of each group twisted together to be interlocked with the turns, said strands holding the cage together and preventing separation and displacement of said turns during molding.

9. A reinforcing cage for use in a molded reinforced flexible hose comprising a plurality of spaced annular turns of resilient material capable of resisting radial deformation of the hose, which turns are connected at spaced points around the turns by groups of longitudinally extending flexible strands, each group comprising at least two strands with the strands of each group twisted together to be interlocked with the turns, said strands holding the cage together and preventing separation and displacement of said turns during molding.

10. A reinforcing cage for use in a molded reinforced flexible hose comprising a plurality of spaced annular turns of resilient material capable of resisting radial deformation of the hose, which turns are connected at spaced points around the turns by groups of longitudinally extending interlaced flexible textile strands, each group comprising at least two strands interlocked with the turns, said strands holding the cage together and preventing separation and displacement of said turns during molding.

11. A reinforcing cage for use in a molded reinforced flexible hose comprising a plurality of spaced helical turns of resilient material capable of resisting radial deformation of the hose, which turns are connected at spaced points around the turns by groups of longitudinally extending interlaced flexible textile strands, each group comprising at least two strands interlocked with the turns, said strands holding the cage together and preventing separation and displacement of said turns during molding.

References Cited
UNITED STATES PATENTS

| | | | |
|---|---|---|---|
| 468,269 | 2/1892 | Stempel | 138—175 |
| 3,058,493 | 10/1962 | Muller | 138—122 |

SAMUEL ROTHBERG, *Primary Examiner.*

B. E. KILE, *Assistant Examiner.*